United States Patent
Frank et al.

(10) Patent No.: US 7,211,921 B2
(45) Date of Patent: May 1, 2007

(54) WINDING SUPPORT OF A SUPERCONDUCTIVE ROTOR, COMPRISING A STRUCTURE TO COMPENSATE FOR AXIAL EXPANSION OF THE SUPPORT

(75) Inventors: Michael Frank, Uttenreuth (DE); Adolf Kühn, Röthenbach (DE); Peter Massek, Forchheim (DE); Peter van Hasselt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 37 days.

(21) Appl. No.: 10/450,625

(22) PCT Filed: Dec. 10, 2001

(86) PCT No.: PCT/DE01/04638

§ 371 (c)(1),
(2), (4) Date: Jun. 17, 2003

(87) PCT Pub. No.: WO02/50985

PCT Pub. Date: Jun. 27, 2002

(65) Prior Publication Data

US 2004/0051419 A1 Mar. 18, 2004

(30) Foreign Application Priority Data

Dec. 20, 2000 (DE) ................. 100 63 724

(51) Int. Cl.
*H02K 55/44* (2006.01)
(52) U.S. Cl. ............... 310/261; 310/268; 310/52; 310/54; 310/270
(58) Field of Classification Search ............... 310/261, 310/262, 270, 52, 54, 60 A
See application file for complete search history.

(56) References Cited

U.S. PATENT DOCUMENTS

| 4,017,755 A | * | 4/1977 | Litz | 310/52 |
| 4,056,745 A | * | 11/1977 | Eckels | 310/52 |
| 4,092,555 A | * | 5/1978 | Ying et al. | 310/52 |

(Continued)

FOREIGN PATENT DOCUMENTS

GB  1 432 476  4/1976

(Continued)

OTHER PUBLICATIONS

Bogner et al., "Electrical Machines with Superconductors", Siemens Forsch.—u. Entwickl. -Ber., vol. 5, 1976, No. 1, pp. 10-16.

*Primary Examiner*—Burton S. Mullins
*Assistant Examiner*—Erik Preston
(74) *Attorney, Agent, or Firm*—Staas & Halsey LLP

(57) ABSTRACT

An aspect of the invention relates to a machine comprising a rotor mounted so it can rotate about a rotational axis, and a superconductive winding located in a winding support. Further, connection devices are provided to retain the winding support inside a rotor external housing. To compensate changes caused by the expansion of the winding support, a connection device should have at least one connection element that extends axially with one end of the element connected to the winding support in a fixed manner, and the opposite free end connected to a centering retaining element of the rotor eternal housing in a non-positive radial fit, so it can be displaced axially.

17 Claims, 2 Drawing Sheets

U.S. PATENT DOCUMENTS

| | | | |
|---|---|---|---|
| 4,117,357 A * | 9/1978 | Baumann | 310/261 |
| 4,146,809 A * | 3/1979 | Rielly | 310/261 |
| 4,171,494 A * | 10/1979 | Yamaguchi et al. | 310/261 |
| 4,178,777 A * | 12/1979 | Ying et al. | 464/98 |
| 4,237,392 A * | 12/1980 | Ying et al. | 310/52 |
| 4,239,999 A | 12/1980 | Vinokurov et al. | 310/52 |
| 4,529,669 A * | 7/1985 | Mori | 310/52 |
| 4,532,445 A | 7/1985 | Iwamoto et al. | 310/261 |
| 6,129,477 A * | 10/2000 | Shoykhet | 310/261 |
| 6,836,043 B2 * | 12/2004 | Boss et al. | 310/261 |

FOREIGN PATENT DOCUMENTS

| | | | |
|---|---|---|---|
| GB | 1 540 933 | | 2/1979 |
| JP | 51125810 A | * | 11/1976 |
| JP | 57-71263 | | 5/1982 |
| JP | 59162764 A | * | 9/1984 |
| JP | 60148370 A | * | 8/1985 |
| JP | 60167674 A | * | 8/1985 |
| JP | 60174059 A | * | 9/1985 |
| JP | 61196762 A | * | 8/1986 |
| JP | 61231873 A | * | 10/1986 |
| JP | 03128662 A | * | 5/1991 |
| JP | 03155363 A | * | 7/1991 |
| JP | 03285559 A | * | 12/1991 |
| JP | 04200263 A | * | 7/1992 |
| JP | 8-242573 | | 9/1996 |
| JP | 10-215561 | | 8/1998 |
| JP | 2002281734 A | * | 9/2002 |

* cited by examiner

US 7,211,921 B2

WINDING SUPPORT OF A SUPERCONDUCTIVE ROTOR, COMPRISING A STRUCTURE TO COMPENSATE FOR AXIAL EXPANSION OF THE SUPPORT

CROSS REFERENCE TO RELATED APPLICATIONS

This application is based on and hereby claims priority to PCT Application No. PCT/DE01/04638 filed on 10 Dec. 2001 and German Application No. 100 63 724.8 filed on 20 Dec. 2000, the contents of which are hereby incorporated by reference.

BACKGROUND OF THE INVENTION

One aspect of the invention relates to a machine having a rotor mounted rotatably about an axis of rotation, a rotor outer casing fixed to axial rotor shaft parts and surrounds a winding support having a superconductive winding. The rotor also has a holding to support the winding within the rotor outer casing, comprising, on a torque-transmitting side, a first rigid connecting device between the winding support and the rotor outer casing, and on the opposite side, a second connecting device, compensating for changes caused by the axial expansion of the winding support. Also provided is a cooling and thermally insulating unit to cool and thermally insulate the superconductive winding. According another aspect of the invention, a method to cool and thermally insulate the superconductive winding is provided. A corresponding machine is disclosed in DE 23 26 016 B2.

Electrical machines, in particular generators or motors, generally have a rotating field winding and a fixed stator winding. By using cryogenic and, in particular, superconductive conductors it is possible in this case to increase the current density and thus the specific output of the machine, for example, the output per kilogram of the machine's weight, and also to increase the efficiency of the machine.

Cryogenic windings of electrical machines generally have to be thermally insulated from the surroundings and kept at the required low temperature by a coolant. Effective thermal insulation, in this case, can only be achieved if the cryogenic parts of the machine are separated from the hot exterior as much as possible by a high vacuum with a residual gas pressure of generally below $10^{-3}$ mbar and if the connecting parts transfer as little heat as possible between these cryogenic parts and the hot exterior.

Two variants are known, in particular, for vacuum insulation of rotors having cryogenic armature windings and hot stator windings: In a first embodiment, the rotor has a hot outer casing and a closed-off vacuum space which rotates with the rotor. The vacuum space is intended here to surround the cryogenic area on all sides (cf., for example, "Siemens Forsch. u. Entwickl.-Ber." (Siemens Research and Development Report), Vol. 5, 1976, No. 1, pages 10 to 16). However, there is an undesirable heat transfer to the cryogenic parts via supports extending through the vacuum space. In a second embodiment, the essentially cold rotor rotates in a high vacuum. Here, the outer boundary of the high-vacuum space is determined by the internal hole in the stator. Such an arrangement does however require high-vacuum-tight shaft seals between the rotor and the stator (cf., for example, DE 27 53 461 A).

In the case of the machine as described in the DE-B2 specification cited at the beginning, the first-mentioned embodiment is implemented. According to the rotor of this machine, the superconductive winding is located in the interior of an armature cryostat which forms, with the flange shafts attached, an outer casing for the rotor. Due to the fact that known superconductor material is used for the conductors of the winding, helium cooling is provided at an operating temperature of around 4 K. In contrast, the outer contour of the rotor outer casing is approximately at room temperature and may even be above this temperature when operating. The useful torque of the machine is generated in the rotor winding. The rotor winding is arranged in a cold winding support which is suspended or held in the rotor outer casing, acting as the cryostat, such that it is for its part insulated. Here, this suspension or holding on the drive side of the rotor must be stable enough to transmit the torque from the cold winding support to a drive-side shaft part. A corresponding, rigid connecting device for transmitting the torque must therefore be designed to be comparatively sturdy and be connected in a force-fitting manner to the winding support and the drive-side shaft part. At the same time, this connecting device undertakes the drive-side centering of the cold winding support. Hardly any torque is transmitted on the opposite rotor side, which is also referred to as the non-drive or operating side, since connections which are important for the operation of the machine, such as, for example, a coolant supply line, are provided on this side. Therefore, essentially only the functions of centering and thermal insulation need to be fulfilled here. Since, however, in a transition from room temperature to the operating temperature the axial length of the winding support is reduced by at least one millimeter in relation to the corresponding expansion of the rotor outer casing, the operating-side suspension must also ensure that there is a corresponding linear compensation. In the case of the machine disclosed in the DE-B2 specification cited at the beginning, radially extending disk-shaped connecting elements which permit a corresponding bending in the axial direction to compensate for expansion are therefore provided between the rotor outer casing and the winding support.

Similarly, in the case of the rotor disclosed in DE 27 17 580 A, too, of an electrical machine having a superconductive excitation winding, a corresponding radially extending connecting element which permits axial deformation is provided between a rotor outer casing and a winding support.

In addition to the metallic superconductor materials which have long been known, such as, for example, NbTi or $Nb_3Sn$, as are used in the abovementioned machines, metal-oxide superconductor materials having transition temperatures of over 77 K have also been known since 1987. Conductors containing such high-$T_c$ superconductor materials, which are also referred to as HTS materials, are being used in attempts to create superconductive windings for machines. Machines having this type of conductor also require a corresponding compensation for expansion in the axial direction due to the differences in temperature between the operating temperature of the superconductor material and the external temperature of the hotter rotor outer casing.

SUMMARY OF THE INVENTION

An object of the present invention is to specify a suitable connecting device of a corresponding machine which permits such an axial compensation for expansion (linear compensation) in a comparatively simple manner, and, in doing so, limits in particular losses of introduced heat in the superconductive winding.

This object is achieved according to the invention by providing a machine having the features mentioned at the beginning where the second connecting devicecompensates for changes caused by expansion, has at least one axially extending connecting element which is, on one side, rigidly connected to the winding support and on the opposite free end is connected to at least one centering holding element of the rotor outer casing in an axially moveable and radially force-fitting manner.

The advantages associated with this configuration of the machine are its simple and inexpensive manufacture, the centering and the low heat loss which can be achieved at the same time. Here, compensation for shrinkage (=axial movement) is permitted by a true relative movement of the two suspension and holding components (the connecting element and the holding element). However, the centering and the rigidity of the connecting device are maintained. No particular combinations of materials are required here and a problem of heat loss is no longer linked to the problem of the material stresses of the suspension due to thermal shrinkage. Moreover, wear problems which are usually inherent in known applications of the machine are less important here.

It is thus possible, in particular, for the axially extending connecting element to be of a hollow-cylindrical design, and to project at its free end into a corresponding opening in the holding element such that it slides in a play-free manner. Play-free sliding is understood here to mean that any frictional forces practically do not impede the axial movement of the end of the connecting element in the opening in the holding element, despite a radial force-fitting connection between these components. It is thus possible to center the connecting element, and thus the rotor, well on the non-torque-transmitting (operating) side.

At least the axially extending connecting element is preferably made of a fiber-reinforced plastic material. Appropriate materials allow sufficient mechanical stability to be ensured with advantageously low heat transfer.

Suitable materials for the conductors of the superconductive winding are a metallic low-$T_c$ superconductor material or, in particular, a metal-oxide high-$T_c$ superconductor material.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
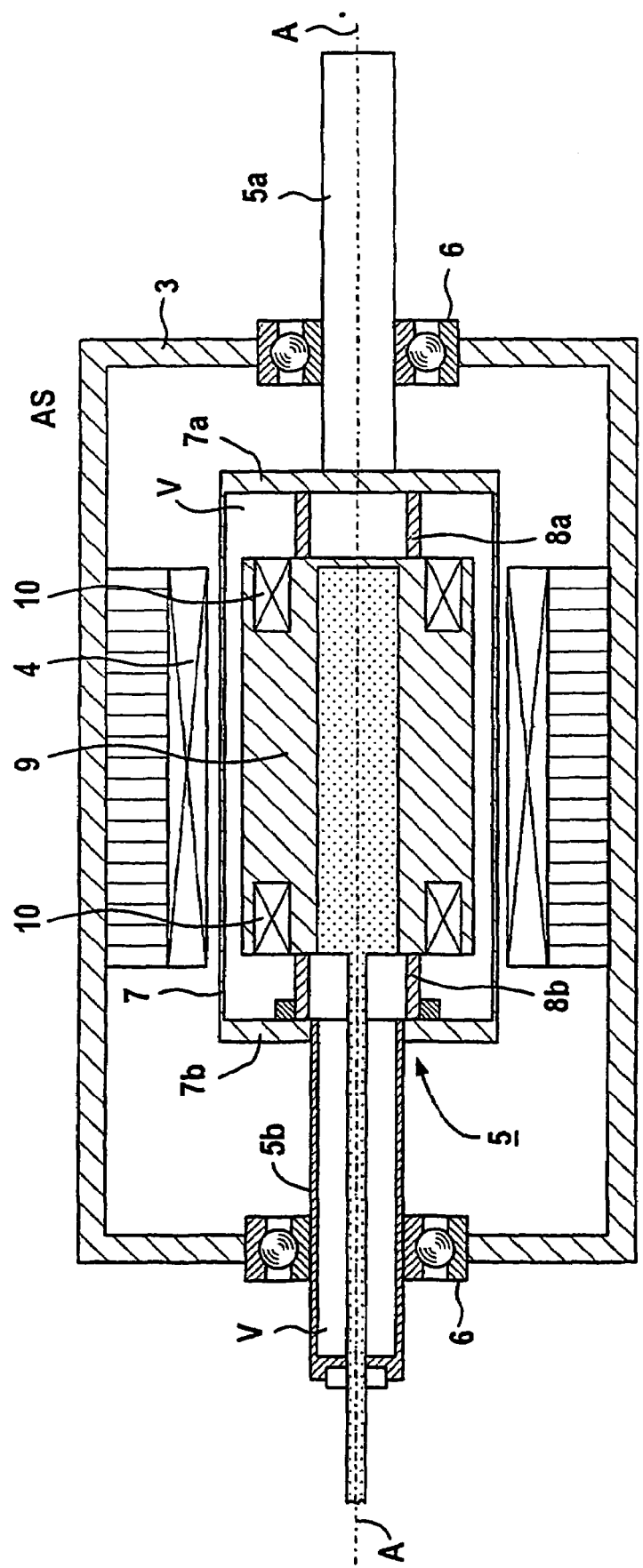
FIG. 1 shows a schematic representation of a possible embodiment of the machine.

Reference will now be made in detail to the preferred embodiments of the present invention, examples of which are illustrated in the accompanying drawings, wherein like reference numerals refer to like elements throughout.

In the figures, corresponding parts have been provided with the same reference symbols.

In the embodiment of the machine explained below, the machine may be, in particular, a synchronous motor or a generator. Naturally, other fields of application and use of corresponding machines are also possible, such as for high rotational speeds, compact drives, for example on ships or for so-called offshore installations, such as, drilling platforms. The machine according to an aspect of the invention comprises a rotating superconductive winding which, in principle, allows metallic LTS material (low-$T_c$ superconductor material) or, in particular, oxide HTS material (high-$T_c$ superconductor material) to be used. The latter material will be used for the exemplary embodiment below. The winding may comprise a coil or a system of coils in a two-pole, four-pole or other multiple arrangement. The basic construction of such a synchronous machine can be seen in FIG. 1, for which known embodiments of such machines were used as the basis (cf., for example, the abovementioned prior art).

The machine, which is designated generally by number 2, comprises a stationary machine outer casing 3, which is at room temperature, including a stator winding 4 contained within it. Within this outer casing, which can be evacuated, and surrounded by the stator winding 4, a rotor 5 is mounted in bearings 6 such that it can rotate about an axis of rotation A. The rotor comprising, on its so-called drive side AS, a sturdy axial rotor shaft part 5a, which is mounted in the corresponding bearing. The rotor has a rotor outer casing 7 which is designed as a vacuum vessel, and in which a winding support 9 having an HTS winding 10 is held. For this purpose, there is a (first) rigid, tubular connecting device 8a on the drive side AS between the winding support 9 and a disk-shaped side part 7a of the rotor outer casing, the side part 7a being fixedly connected to the rotor shaft part 5a. Torque is also transmitted via the rigid connecting device 8a. This connecting device essentially advantageously comprises a hollow cylinder having low thermal conductivity, in particular, for example, a glass fiber-reinforced plastic material (so-called GFRP material) or a plastic material reinforced with other fibers. This material ensures a mechanical rigidity and shear modulus (G modulus) which are sufficient for transmitting torque in conjunction with low thermal conductivity. On the non-drive side or operating side, which is designated below as BS and is opposite the drive side AS, is arranged a (second) connecting device 8b, which is configured according to the invention, between the winding support 9 and a disk-shaped side part 7b of the rotor outer casing 7.

In FIG. 1, a hollow-cylindrical shaft part 5b is also indicated on the side BS remote from the drive and this shaft part 5b is rigidly connected, on its side facing the rotor outer casing 7, to the disk-shaped side part 7b of the rotor outer casing 7. A supply of coolant to cool the superconductive winding 10 is provided, among other things, via this shaft part, which is mounted in a bearing 6, from outside the machine. Details of the coolant supply and the seal are known. For this reason, the figure does not show these parts in detail. A vacuum surrounding the winding support 9 having the superconductive winding 10 is designated by V. The vacuum is present in particular between the hot rotor outer casing 7 and the winding support 9.

For purposes of thermal insulation, primarily suitable as the material for a central suspension of the winding support 9, even on the rotor side BS which transmits hardly any torque, are GFRPs in radially extending and/or in particular axially extending parts. A particular embodiment of a corresponding connecting device 8b can be seen in FIG. 2. This connecting device has as a connecting element 12 a GFRP tube which is fixed at one end, for example in a flange 13, via adhesive bonding. This flange is rigidly connected to a cold part of the winding support 9 such that it is thermally conductive, for example, the flange being screwed to the winding support. The flange can, however, also be part of the winding support itself or be connected to other parts of the winding support. The opposite free end 12a of the GFRP tube 12 is advantageously held by a hardened supporting ring 15. This ring, which is generally made of metal, such as hardened steel, is intended to be able to slide in a play-free manner in the opening 20 in a holding element 18 surrounding it. Play-free sliding, in this case, is intended to mean an axial movement of the end 12a of the connecting element 12 or its supporting ring 15 in the corresponding opening 20 in the holding element 18 where the movement practically not impeded by any frictional forces. At the same time, it is, however, intended for a radial force-fitting connection to be retained between the supporting ring and the holding element. The holding element 18 is therefore advantageously made of the same material as the supporting ring. This essentially annular holding element 18 is embedded in a hot flange 19, is connected to it, or is part of it. This flange 19 is part of the side part 7b of the rotor outer casing 7 or of the shaft part 5b.

In order to make it easier for the supporting ring 15 and the holding element 18 to slide against one another in the axial direction, one of these components, for example, the holding element 18 on the inside of the opening 20, is advantageously provided with radially extending protrusion-like extensions 17i which are arranged at regular intervals in the circumferential direction and against which the supporting ring 15 bears in a form-fitting or force-fitting manner. The contact surface between the two parts, and thus, the frictional force on the region of the protrusions, is reduced without the interference fit (press fit) required for the radial force-fitting connection being relinquished. In accordance with a corresponding specific exemplary embodiment, the diameter of the GFRP tube 12 is, for example, 90 mm with a wall thickness of 2 mm. The length of free tube is, for example, 40 mm. The exactness of manufacture determines the concentricity of the individual parts in relation to one another. The supporting ring 15 of hardened steel having an outer diameter of 100 mm is fitted into the guide protrusions 17i, pointing radially inward, of the holding element 18 of hardened steel such that, on the one hand, there is no freedom of play, but that, on the other hand, it is still possible to ensure an axial movement of the ring in the protrusion mount in the event of forces occurring. For this purpose, the holding element 18 is of an essentially hollow-cylindrical design having an outer diameter of 133 mm and an axial extent of 25.5 mm. Except for in the region of its guide protrusions 17i, of which there are, for example, 6, its wall thickness is 7.5 mm. In the region of the protrusions, the inner diameter of the holding element is reduced to about 100 mm. An axial linear compensation is thus made possible when cooling and heating the support body 9. Moreover, this design also allows manufacturing tolerances to be compensated in the axial direction to a certain degree.

In the specific exemplary embodiment, the connecting device 8b represents a heat loss of about 2.5 W and therefore also fulfils the function of thermal insulation sufficiently well. An estimation of the thermal transition resistance between the guide protrusions and the supporting ring has shown that it can be small enough for no significant cooling (considerably below 1 K) and thus no shrinkage of the supporting ring, with the associated loss of the centering function, to be a concern.

Figure 2:
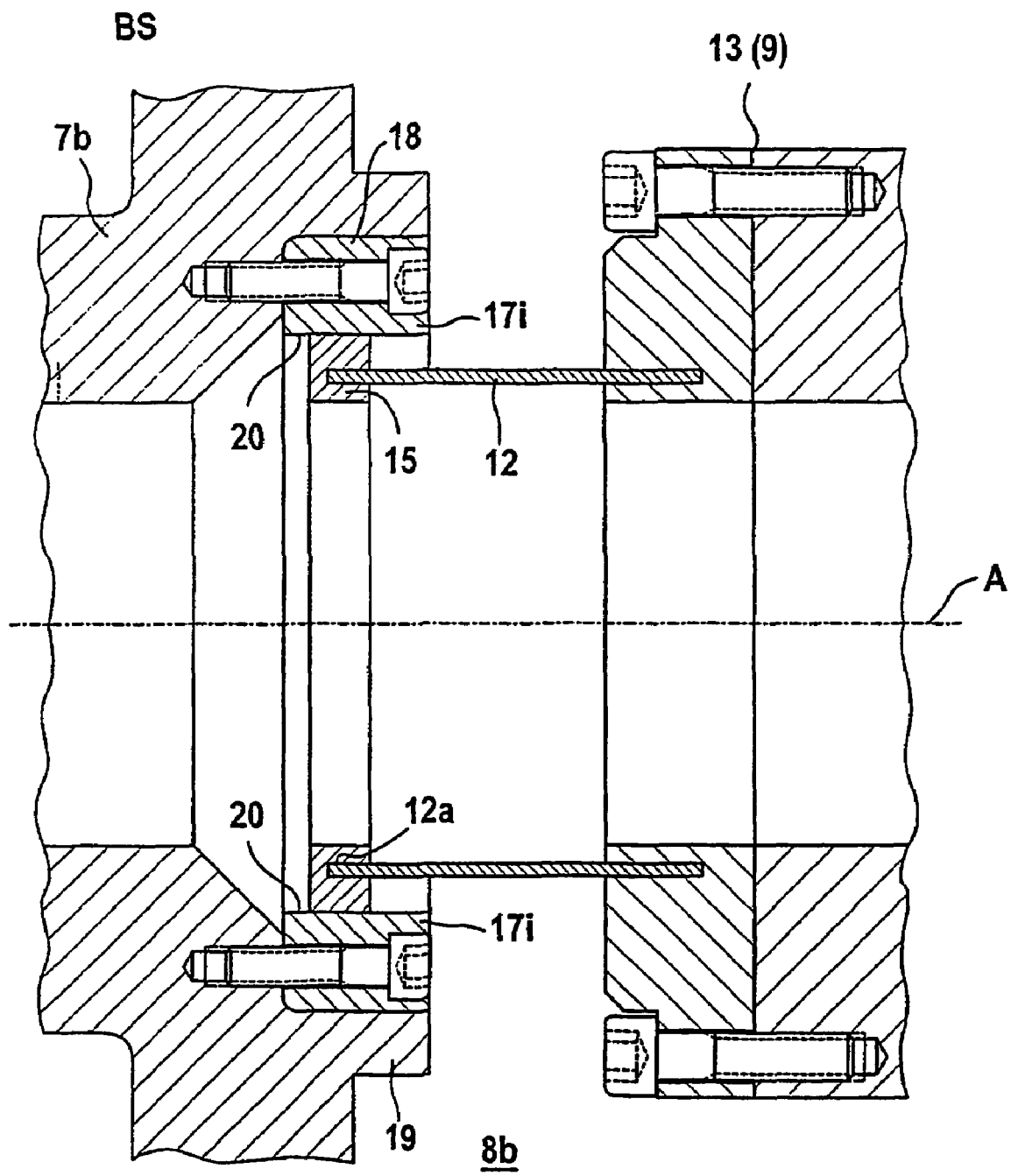
FIG. 2 shows a schematic representation of a particular configuration of a connecting device of this machine.

Deviating from the embodiment of the connecting device having a hollow-cylindrical connecting element 12 depicted in FIG. 2, other embodiments are also conceivable in which a hollow-cylindrical connecting element is, on one side, rigidly connected to the winding support and, at its opposite free end, is connected to a holding element, which is fixed rigidly to the rotor outer casing, in an axially moveable and radially force-fitting manner. It is thus also possible, for example, for teeth to be provided on the holding element instead of the protrusions assumed. Corresponding extensions may also be provided, instead of on the holding element, on the free end of the connecting element, in particular on its supporting ring. If desired, it is also possible for the two parts to be fitted with the type of extensions which can also engage in one another.

In addition, it is not necessary for a single central connecting device to be provided according to the invention. Instead, it is also possible for a plurality of connecting devices which are distributed regularly over an imaginary cylinder outer surface to be provided. Thus, for example, 3 connecting devices which are offset by 120° with respect to one another in the circumferential direction are conceivable.

Furthermore, it is also possible to use, instead of a connecting element 12 in the form of a closed hollow cylinder, an arrangement of a plurality of individual parts resting on an imaginary cylinder outer surface. These individual parts representing corresponding connecting elements can be, for example, of a bar- or rod-shaped design.

In general, the connecting element can be of a multi-part design. The same also applies to the holding element surrounding it. This element, too, can comprise, if appropriate, a plurality of parts.

The invention has been described in detail with particular reference to preferred embodiments thereof and examples, but it will be understood that variations and modifications can be effected within the spirit and scope of the invention.

The invention claimed is:

1. A machine having a rotor mounted rotatably about an axis of rotation, comprising:
    a rotor outer casing fixed to axial rotor shaft parts, surrounding a winding support having a superconductive winding;
    a holding unit to support the winding within the rotor outer casing, including:
        a first connecting device having a low thermal conductivity, formed on a torque-transmitting side, between the winding support and the rotor outer casing, and
        a second connecting device provided on an opposite side to compensate for changes caused by axial expansion of the winding support, the second connecting device having at least one axially extending connecting element of low thermal conductivity rigidly connected to the winding support on one end, and connected to at least one centering holding element of the rotor outer casing in an axially moveable and radially force-fitting manner on an opposite free end, wherein the free end of the axially extending connecting element is provided with a metal supporting ring which projects into an opening of the holding element and slides in a play-free manner such that the metal supporting ring and the holding element slide against one another in an axial direction, and the metal supporting ring is formed of a different material from the axially extending connecting element such that a material of the metal supporting ring is a hardened steel and a material of the axially extending connecting element is a fiber-reinforced plastic material; and cooling and thermally insulating units for the superconductive winding.

2. The machine as claimed in claim 1, wherein the axially extending connecting element is of a hollow-cylindrical design.

3. The machine as claimed in claim 1, wherein the holding element and/or the free end of the connecting element are/is provided with radially extending extensions, against which the free end of the connecting element or the holding element bears in the axial direction such that it slides in a play-free manner.

4. The machine as claimed in claim 3, wherein the extensions are of sharply shaped design.

5. The machine as claimed in claim 1, wherein the axially extending connecting element is arranged centered about the rotor axis.

6. The machine as claimed in claim 1, wherein the second connecting device has a plurality of axially extending connecting elements arranged on an imaginary cylinder outer surface, the free ends of these connecting elements being connected to at least one holding element in an axially moveable and radially force-fitting manner.

7. The machine as claimed in claim 6, wherein the connecting elements are of a bar shaped design.

8. The machine as claimed in claim 1, wherein conductors of the superconductive winding contain a metallic low-$T_c$ superconductor material or a metal-oxide high-$T_c$ superconductor material.

9. The machine as claimed in claim 1, wherein a vacuum space is provided at least between the rotor outer casing and the winding support.

10. The machine as claimed in claim 1, wherein at least one connecting device is rigid.

11. The machine as claimed in claim 10, wherein the holding element and/or the free end of the connecting element are/is provided with radially extending extensions, against which the free end of the connecting element or the holding element bears in the axial direction such that it slides in a play-free manner.

12. The machine as claimed in claim 11, wherein the axially extending connecting element is arranged central to the rotor axis.

13. The machine as claimed in claim 11, wherein the second connecting device has a plurality of axially extending connecting elements arranged on an imaginary cylinder outer surface, the free ends of these connecting elements being connected to at least one holding element in an axially moveable and radially force-fitting manner.

14. The machine as claimed in claim 13, wherein the axially extending connecting element is made of a fiber-reinforced plastic material.

15. The machine as claimed in claim 14, wherein conductors of the superconductive winding contain a metallic low-$T_c$ superconductor material or a metal-oxide high-$T_c$ superconductor material.

16. The machine as claimed in claim 15, wherein a vacuum space is provided at least between the rotor outer casing and the winding support.

17. A machine, comprising:
    a rotor mounted rotatably about an axis of rotation, the rotor having a rotor shaft;
    a super-conductive winding;
    a winding support to hold the winding;
    a rotor outer casing fixed to the rotor shaft and surrounding the winding support;
    a holding unit to support the winding within the rotor outer casing, comprising:
        a first connecting device, which is rigid, has a low thermal conductivity, and is positioned on a torque-transmitting side of a machine, between the winding support and the rotor outer casing;
        a centering holding element connected to the rotor outer casing; and
        a second connecting device provided on a side of the machine opposite to the first connecting device, to compensate for changes caused by axial expansion of the winding support, the second connecting device having an axially extending connecting element with a low thermal conductivity and opposing rigid and free ends, the rigid end being rigidly connected to the winding support, the free end being connected to the centering holding element in an axially moveable and radially force-fitting manner, wherein the free end of the axially extending connecting element is provided with a metal supporting ring which projects into an opening of the holding element and slides in a play-free manner such that the metal supporting ring and the holding element slide against one another in an axial direction, and the metal supporting ring is formed of a different material from the axially extending connecting element, wherein a material of the metal supporting ring is a hardened steel and a material of the axially extending connecting element is a fiber-reinforced plastic material; and
    cooling and thermally insulating units for the superconductive winding.

* * * * *